United States Patent
Mizrahi

(10) Patent No.: US 10,651,974 B2
(45) Date of Patent: May 12, 2020

(54) METHOD AND APPARATUS FOR UPDATING ERROR DETECTION INFORMATION IN PACKETS

(71) Applicant: Marvell World Trade Ltd., St. Michael (BB)

(72) Inventor: Tal Mizrahi, Haifa (IL)

(73) Assignee: Marvell Asia Pte, Ltd., Singapore (SG)

( * ) Notice: Subject to any disclaimer, the term of this patent is extended or adjusted under 35 U.S.C. 154(b) by 79 days.

(21) Appl. No.: 15/900,470

(22) Filed: Feb. 20, 2018

(65) Prior Publication Data

US 2018/0248656 A1    Aug. 30, 2018

Related U.S. Application Data

(60) Provisional application No. 62/464,735, filed on Feb. 28, 2017.

(51) Int. Cl.
  *H04L 1/00*  (2006.01)
  *G06F 11/10*  (2006.01)
  *H04L 29/06*  (2006.01)

(52) U.S. Cl.
  CPC ........ *H04L 1/0061* (2013.01); *G06F 11/1004* (2013.01); *H04L 69/22* (2013.01)

(58) Field of Classification Search
  CPC ..... H04L 1/0057; H04L 1/0072; H04L 69/22; H04L 1/0041; H04L 1/0061; H04L 43/0847; H03M 13/093; H03M 13/096; G06F 11/1004; G06F 11/1064
  See application file for complete search history.

(56) References Cited

U.S. PATENT DOCUMENTS

| | | | |
|---|---|---|---|
| 5,768,299 A * | 6/1998 | Whittaker | G06F 11/1064 714/800 |
| 5,793,976 A | 8/1998 | Chen et al. | |
| 7,688,842 B2 | 3/2010 | Pullen et al. | |
| 8,031,734 B2 | 10/2011 | Pullen et al. | |
| 8,238,335 B2 | 8/2012 | Michaelis et al. | |
| 8,554,911 B2 | 10/2013 | Jean | |
| 8,571,014 B2 | 10/2013 | Joergensen et al. | |
| 8,868,914 B2 | 10/2014 | Teppler | |
| 8,948,037 B1 | 2/2015 | Mizrahi | |
| 9,264,333 B1 | 2/2016 | Mizrahi | |

(Continued)

OTHER PUBLICATIONS

Braden et al., "Computing the Internet Checksum," RFC 1071, DOI 10.17487/RFC1071, Sep. 1988, pp. 1-24, available at https://www.rfc-editor.org/info/rfc1071.

(Continued)

*Primary Examiner* — Shelly A Chase

(57) ABSTRACT

A network device receives a packet having i) a first field that is to be updated by the network device, and ii) a second field that includes current error detection information corresponding to content of the packet, the content including the first field. The network device determines an update value that is to be added to a current value of the first field to generate a new value of the first field. The network device generates new error detection information using the current error detection information and the update value, and without using the current value of the first field. The network device modifies the second field to include the new error detection information, and modifies the first field to include the new value.

20 Claims, 4 Drawing Sheets

(56) References Cited

U.S. PATENT DOCUMENTS

| | | |
|---|---|---|
| 9,847,925 B2 | 12/2017 | Mizrahi et al. |
| 2001/0021176 A1 | 9/2001 | Mimura et al. |
| 2005/0007988 A1 | 1/2005 | Ferris et al. |
| 2005/0089031 A1* | 4/2005 | Krueger .............. H03M 13/093 370/389 |
| 2005/0094572 A1 | 5/2005 | Mimura et al. |
| 2010/0165849 A1 | 7/2010 | Eisenberg et al. |
| 2013/0083808 A1 | 4/2013 | Sridhar |
| 2017/0111483 A1* | 4/2017 | Wang ................... H04L 1/0061 |

OTHER PUBLICATIONS

IEEE P1588™ D2.2 "Draft Standard for a Precision Clock Synchronization Protocol for Networked Measurement and Control Systems," The Institute of Electrical and Electronics Engineers, Inc., 2008.

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc* ., IEEE Standard, pp. 1-289 (Jul. 24, 2008).

IEEE Std. C37.238™-2011, "IEEE Standard Profile for Use of IEEE 1588™ Precision Time Protocol in Power System Applications," *Institute for Electrical and Electronics Engineers, Inc* ., pp. 1-66 (Jul. 2011).

IEEE P802.1AS/D0.8, "Draft Standard for Local and Metropolitan Area Networks-Timing and Synchronization for Time-Sensitive Applications in Bridged Local Area Networks," The Institute of Electrical and Electronics Engineers, Inc., pp. 1-149 (May 25, 2007).

Abstract of IEEE 802.1AS Standard, "802.1AS-Timing and Synchronization," *The Institute of Electrical and Electronics Engineers, Inc* ., available at http://www.ieee802.org/1/pages/802.1as.html, 1 page (Mar. 30, 2011).

ITU-T Recommendation G.8265.1/Y.1365.1, "Precision time protocol telecom profile for frequency synchronization," *Int'l Telecommunication Union* , pp. 1-28 (Oct. 2010).

Chin et al., "IEEE 1588 Clock Synchronization using Dual Slave Clocks in a Slave," IEEE Communications Letters, vol. 13, No. 6, pp. 456-458 (Jun. 2009).

Deering et al., "Internet Protocol Version 6 (1 Pv6) Specification," Request for Comments: 2460, *Internet Engineering Task Force (IETF)* (Dec. 1998).

Hedayat et al., "A Two-Way Active Measurement Protocol (TWAMP)," Request for Comments: 5357, *Internet Engineering Task Force (IETF)* (Oct. 2008).

Mills, "Internet Time Synchronization: The Network Time Protocol," Network Working Group Request for Comments, No. 1129, pp. 1-29 (Oct. 1989).

Mills et al., "Network Time Protocol Version 4: Protocol and Algorithms Specification," Request for Comments: 5905, *Internet Engineering Task Force (IETF)*, pp. 1-111 (Jun. 2010).

Postel, "User Datagram Protocol," Request for Comments: 768, *Internet Engineering Task Force (IETF)* (Aug. 1980).

Rijsinghani, "Computation of the Internet Checksum via Incremental Update," Request for Comments: 1624, *Internet Engineering Task Force (IETF)* (May 1994).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Shalunov et al., "A One-Way Active Measurement Protocol (OW AMP)," Request for Comments: 4656, *Internet Engineering Task Force (IETF)* (Sep. 2006).

\* cited by examiner

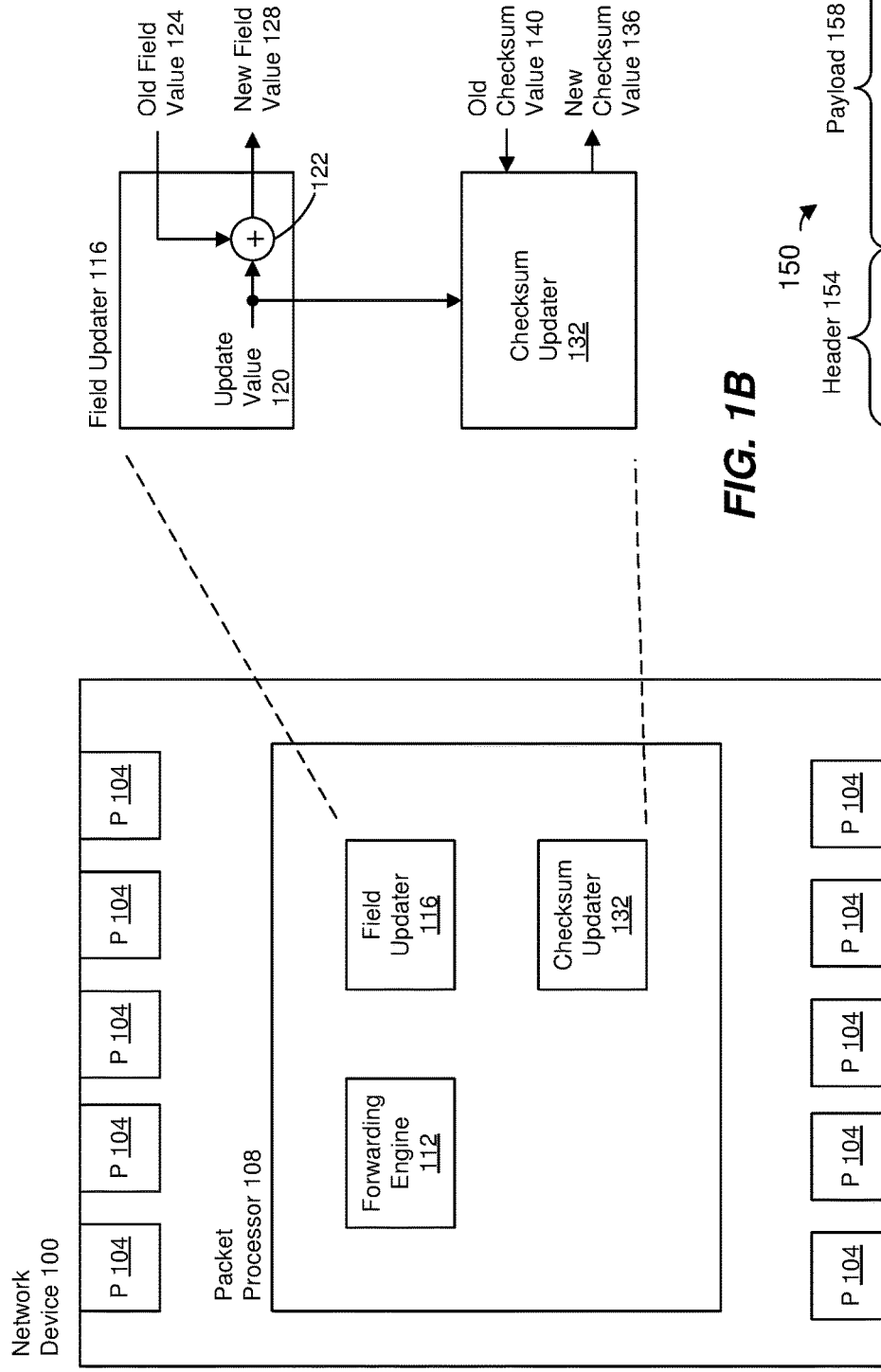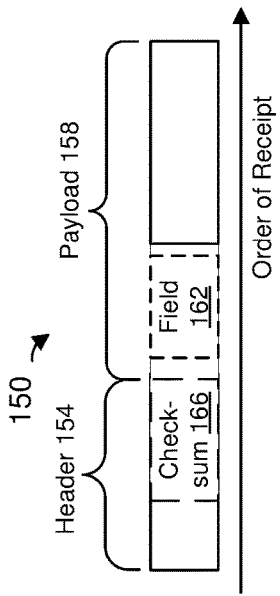
FIG. 1A
FIG. 1B

METHOD AND APPARATUS FOR UPDATING ERROR DETECTION INFORMATION IN PACKETS

CROSS REFERENCES TO RELATED APPLICATIONS

This application claims the benefit of U.S. Provisional Patent Application No. 62/464,735, entitled "Method for Incremental Checksum Update of Added Values in Network Packets," filed on Feb. 28, 2017, which is hereby incorporated herein by reference in its entirety.

FIELD OF TECHNOLOGY

The present disclosure relates generally to network communication systems, and more particularly to updating error detection information in packets within a network communication system.

BACKGROUND

Communication packets often include error detection information such as checksums that are used by receiving nodes in a network to verify the integrity of information in received communication packets. In some situations, an intermediate node in a network that processes a communication packet modifies contents of the communication packet. For example, the intermediate node may modify a timestamp field, a time delay field, a hop count field, a time-to-live (TTL) field, etc. Although integrity of the communication packet remains otherwise sound, the modified field will invalidate the checksum. In some prior art systems, when modifying a field of a packet invalidates a checksum in the packet, the checksum field is set to a value of zero to avoid an erroneous error indication, which causes the receiving device to ignore the checksum value. Thus, the receiving device is unable to verify the integrity of the received communication packet using the checksum field.

U.S. Pat. No. 8,948,037 describes a method for adding a checksum trailer to a packet when a timestamp field in the packet is modified. For example, in one embodiment described in U.S. Pat. No. 8,948,037, a checksum trailer value is determined to maintain correctness of a checksum field in the packet after the timestamp field has been modified, and a padding field of the packet, separate from the checksum field, is set to the checksum trailer value.

SUMMARY

In an embodiment, an apparatus comprises logic circuitry configured to: determine an update value that is to be added to a current value of a first field of a packet to update the first field in the packet, the packet also having a second field that includes current error detection information corresponding to content of the packet, and generate new error detection information using i) the current error detection information from the second field of the packet and ii) the update value, and without using the current value from the first field of the packet. The apparatus also comprises; and packet modification circuitry configured to: modify the second field of the packet to include the new error detection information, and modify the first field of the packet to include the new value.

In another embodiment, a method includes: receiving, at a network device, a packet having i) a first field that is to be updated by the network device, and ii) a second field that includes current error detection information corresponding to content of the packet, the content including the first field; determining, at the network device, an update value that is to be added to a current value of the first field to generate a new value of the first field; generating, at the network device, new error detection information using the current error detection information and the update value, and without using the current value of the first field; modifying, at the network device, the second field to include the new error detection information; and modifying, at the network device, the first field to include the new value.

BRIEF DESCRIPTION OF THE DRAWINGS

FIG. 1A is a block diagram of an example network device that processes network data units (e.g., packets), including modifying fields of the packets prior to transmitting the packets, according to an embodiment.

FIG. 1B is a diagram of an example packet processed by the example network device of FIG. 1A, according to an embodiment.

DETAILED DESCRIPTION

Figure 2:
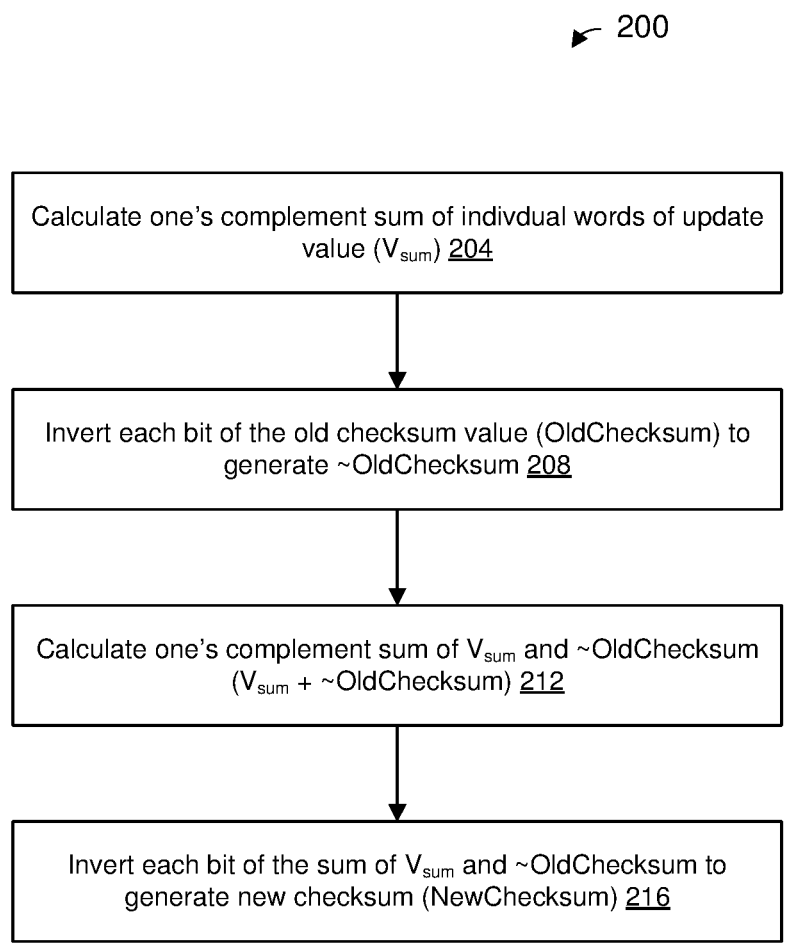
FIG. 2 is a flow diagram of an example method for calculating a new checksum value of a packet, according to an embodiment.

Embodiments of techniques for updating error detection information in network data units are described below in the context of checksums such as used in Internet Protocol (IP) packets, User Datagram Protocol (UDP) data units, and Transmission Control Protocol (TCP) data units merely for illustrative purposes. In other embodiments, however, similar techniques are used for updating other types of error detection information in other types of network data units.

FIG. 1A is a high-level, simplified block diagram of an example network device 100 configured for processing and forwarding network data units (referred to herein as "packets"), according to an embodiment. The network device 100 includes a plurality of ports 104 coupled to respective network links (not shown). The network device 100 also includes a packet processor 108 that processes packets ingressing the network device 100 via the ports 104, including making forwarding decisions. In an embodiment, making a forwarding decision for a packet includes, for example, at least determining one or more ports 104 via which the packet is to be egressed. Other functions performed by the packet processor 108 include one or more of i) determining whether a packet should be trapped or mirrored to another processor (not shown) for further analysis, ii) determining whether a packet should be discarded, iii) metering, iv) policing, etc. It is noted that the diagrams of packet processors shown in the figures are highly simplified. In actuality, suitable packet processors typically include numerous additional components and provide numerous additional functionalities that are not shown or discussed, solely in an effort not to obfuscate the teaching principles of the current disclosure.

The packet processor 108 includes a forwarding engine 112, which includes, or is coupled to, a forwarding database (not shown) that includes information that associates address information (e.g., from received packets) with indications of ports 104 to which received packets should be forwarded. In an embodiment, the forwarding engine 112 generally uses i) address information in a header of a packet, and ii) information in the forwarding database to determine to which port(s) 104 the packet should be forwarded.

The packet processor 108 comprises a field updater 116 that is configured to update fields in received packets. For example, the field updater 116 includes logic circuitry configured to update fields in packets such as a timestamp field, a time delay field (e.g., a field that is used to monitor an amount of time that a packet is delayed in intermediate nodes such as switches or routers), a hop count field, a time-to-live (TTL) field, etc. As will be described in more detail below, the field updater 116 is configured to update a particular field in a packet by adding an update value 120 to an old value 124 of the particular field to generate a new value 128 of the particular field. Accordingly, in an embodiment, the field updater 116 includes an adder 122 (e.g., an adder circuit).

The packet processor 108 also includes a checksum updater 132 that is configured to update checksum fields in received packets in accordance with changes to fields made by the field updater 116. For example, as will be described in more detail below, the checksum updater 132 includes logic circuitry configured to update a checksum in a packet using the update value 120 used by the field updater 116 to update another field in the packet. More specifically, the checksum updater 132 is configured to generate a new checksum value 136 using an old checksum value 140 and the update value 120. As will be described in more detail below, the checksum updater 132 is capable of updating the checksum prior to the field updater 116 updating the other field in the packet.

FIG. 1B is a diagram of a packet 150 that is received by the network device 100 via one of the ports 104, and that is processed by the packet processor 108. The packet 150 includes a header portion 154 and payload portion 158. In an embodiment, a field 162 in the payload portion 158 is updated by the field updater 116. Additionally, the header portion 154 of the packet 150 includes a checksum field 166, and the checksum updater 132 updates the checksum field 166.

The packet 150 is received at one of the ports 104 of the network device 100 in an order from left to right as illustrated in FIG. 1B, i.e., the header portion 134 is received first and the payload portion 138 is received after the header portion 134 has been received. Similarly, the packet processor 108 generally reads information from the packet 150 in an order from left to right as illustrated in FIG. 1B, i.e., the header portion 154 is read first and the payload portion 158 is read after the header portion 154 has been read, according to an embodiment.

Thus, the packet processor 108 processes the checksum field 166 prior to the packet processor 108 processing the field 162, e.g., prior to the packet processor 108 determining an old value of the field 162, according to an embodiment. Referring again to FIG. 1A, the checksum updater 132 updates the checksum field 166 using the update value 120 that will later be used by the field updater 116 to update the field 142, and the checksum updater 132 updates the checksum field 166 without using the old value 124 of the field 162, according to an embodiment. Because the checksum updater 132 updates the checksum field 166 without using the old value 124 of the field 162, the checksum updater 132 can update the checksum field 166 before the packet processor 108 determines the old value 124 of the field 162, according to an embodiment.

In an embodiment, after the checksum updater 132 updates the checksum field 166, the field updater 116 reads the old value 124 of the field 162, adds the update value 120 to the old value 124 to generate the new value 128 of the field 162, and then sets the field 162 to the new value 128. In an embodiment in which the field 162 is a time delay field (e.g., a field that is used to monitor an amount of time that a packet is delayed in intermediate nodes such as switches or routers), the update value 120 corresponds to a measured or estimated amount of delay within the network device 100. In another embodiment in which the field 162 is a TTL field, the update value 120 is one, i.e., the field updater 116 increments the old value 124 of the field 162.

In an embodiment, the field updater 116 is configured to use a type of addition utilized by the checksum updater 132 to update the field 162 so that the new checksum value 136 is valid for the new field value 128. For example, the checksum 166 is calculated using one's complement addition, and thus the field updater 116 uses one's complement addition to update the field 162, e.g., the adder 122 is a one's complement adder, according to an embodiment. With one's complement addition, a negative number is represented as a bit-wise complement (or one's complement) of the corresponding positive number. With this type of number representation, one's complement addition requires adding a carry out of the most significant bit to the least significant bit of the one's complement sum (sometimes referred to as "end around carry"), according to an embodiment.

Another suitable addition technique is two's complement addition. In two's complement addition, a negative number is represented as a bit-wise complement of the corresponding positive number, added with one. With this type of number representation, two's complement addition ignores a carry out of the most significant bit of a sum (e.g., there is no "end around carry"), according to an embodiment, unlike one's complement addition.

As an illustrative example, the checksum 166 is calculated according to the Network Working Group's Request for Comments (RFC) 1071 of 1988, which involves ones' complement addition. In the technique described in RFC 1071, packet contents for which the checksum is to be calculated are partitioned into 16-bit words to serve as addends to be summed, and a one's complement sum of the 16-bit words is calculated. In calculating the one's complement sum, any carry out of the most significant bit is added to the least significant bit of the one's complement sum. Finally, the checksum is calculated by inverting each bit of the one's complement sum. According to this embodiment, the field updater 116 adds the update value 120 to the old value 124 to generate the new value 128 of the field 162 using one's complement addition, and then sets the field 162 to the new value 128.

In an embodiment, the packet processor 108 includes header parser circuitry (not shown) configured to parse the header portion 154 and extract header information, including the old checksum value 140 from the checksum field 166, as well as other header information. Thus, in an embodiment, the header parser circuitry provides the old checksum value 140 to the checksum updater 132. In another embodiment, the checksum updater 132 includes parser circuitry specifically configured to extract the old checksum value 140 from the checksum field 166.

In an embodiment, the packet processor 108 comprises packet modification circuitry to modify various fields in packets being processed by the packet processor 108. For example, the packet modification circuitry includes header modification circuitry (not shown) configured to modify various fields of the header portion 154 in response to other circuitry in the packet processor 108. Thus, in an embodiment, the checksum updater 132 instructs the header modification circuitry to write the new checksum value 136 to the checksum field 166. In another embodiment, the checksum updater 132 includes checksum field modification circuitry specifically configured to write the new checksum value 136 to the checksum field 166. Additionally, the packet modification circuitry is configured to modify the field corresponding to the new value 128 generated by the field updater 116. For example, the packet modification circuitry includes additional packet modification circuitry (not shown), separate from the header modification circuitry, that is configured to modify the field corresponding to the new value 128 generated by the field updater 116, according to an embodiment.

In an embodiment, the field updater 116 includes parser circuitry configured to extract the old field value 124 from the field 162. In an embodiment, field updater 116 includes field modification circuitry specifically configured to write the new field value 128 to the field 162.

FIG. 2 is a flow diagram of an example method 200 for calculating a new checksum value of a packet using i) an old checksum value of the packet and ii) an update value that is (or will be) used to update another field (e.g., the field 142 of FIG. 1B) of the packet, according to an embodiment. For illustrative purposes, the method 200 is described in the context of a checksum that is calculated according to the RFC 1071 discussed above. In other embodiments, however, the checksum is calculated according to another suitable algorithm, or suitable error detection information other than a checksum is updated.

In an embodiment, the checksum updater 132 is configured to implement the method 200, and the method 200 is described in the context of the network device 100 of FIG. 1A and the packet 150 of FIG. 1B for explanatory purposes. In other embodiments, however, the method 200 is implemented by another suitable network device.

At block 204, a one's complement sum ($V_{sum}$) of individual 16-bit words of the update value 120 is calculated. For example, the checksum updater 132 includes a one's complement adder (e.g., an adder circuit) and the checksum updater 132 uses the one's complement adder of the checksum updater 132 to compute the one's complement sum of individual 16-bit words of the update value 120, according to an embodiment.

At block 208, each bit of the old checksum value (OldChecksum) in the packet is inverted to generate a value ~OldChecksum. For example, the checksum updater 124 includes logic circuitry configured to invert each bit of OldChecksum. At block 212, a one's complement sum of $V_{sum}$ and ~OldChecksum is calculated. For example, the checksum updater 132 uses the one's complement adder of the checksum updater 132 to compute the one's complement sum of $V_{sum}$ and ~OldChecksum, according to an embodiment.

At block 216, the new checksum value (NewChecksum) is calculated by inverting each bit of the sum of $V_{sum}$ and ~OldChecksum. For example, the checksum updater 132 includes logic circuitry configured to invert each bit of the sum of $V_{sum}$ and ~OldChecksum.

According to an embodiment, blocks 208, 212, and 216 of the method 200 implement the following equation:

$$\text{NewChecksum} = \sim(\sim\text{OldChecksum} + V_{sum}) \qquad \text{Equation 1}$$

where "+" denotes a one's complement addition operation, and "~" indicates a bitwise logical inversion (or bitwise logical NOT) operation.

As discussed above, the checksum updater 132 includes a one's complement adder, according to an embodiment. In another embodiment, the field updater 116 and the checksum updater 132 share a one's complement adder. In an embodiment, the checksum updater 132 includes a hardware state machine configured to use an adder circuit and bit inversion circuitry to calculate NewChecksum according to the method 200 and/or Equation 1. In another embodiment, the checksum updater 132 includes a processor that executes machine readable instructions and that is configured to calculate NewChecksum according to the method 200 and/or Equation 1.

Although FIGS. 1A and 2 were described in the context of updating the checksum 166 in connection with one field 162 being updated, the checksum 166 can be similarly updated in connection with multiple fields of the packet being updated. For example, in an embodiment, the field updater 116 is configured to update a plurality of fields in a packet by adding respective update values to respective old values of the fields to generate respective new values of the fields. In another embodiment, the packet processor 108 include a plurality of respective field updaters 116 that are each configured to update a respective field in a packet by adding a respective update value to respective old value of the respective field to generate a respective new value of the field.

In some embodiments in which multiple fields of the packet are being updated, the checksum updater 132 is configured to repeatedly update the checksum 166 using techniques such as described above.

In another embodiment in which multiple fields of the packet are being updated, the checksum updater 132 is configured to calculate respective one's complement sums of individual 16-bit words of respective update values corresponding to the multiple fields being updated. For example, the checksum updater 132 is configured to calculate $V_{sum,1}$, $V_{sum,2}$, . . . , corresponding to the multiple fields being updated in a manner similar to that discussed above in connection with FIG. 2, according to an embodiment. Then, the new checksum value (NewChecksum) is calculated according to:

$$\text{NewChecksum} = \sim(\sim\text{OldChecksum} + V_{sum,1} + V_{sum,2} + \ldots). \qquad \text{Equation 2}$$

Figure 3A:
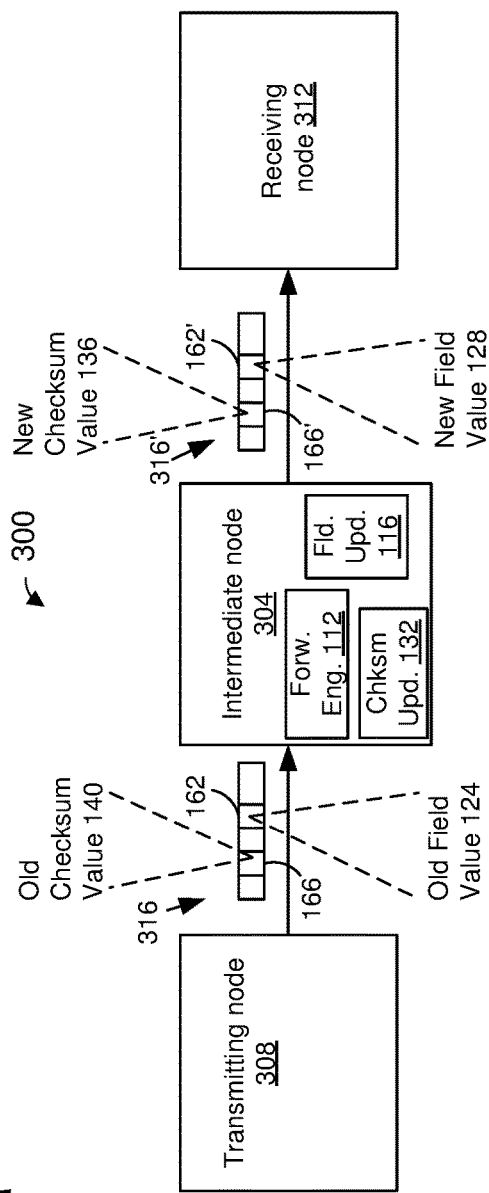
FIG. 3A is a block diagram of an example network device that modifies fields of packets prior to transmitting the packets, according to an embodiment.

FIG. 3A is a block diagram of an example network 300 that includes an intermediate node 304 in an example arrangement between a transmitting node 308 and a receiving node 312, according to an embodiment. In an embodiment, the intermediate node 304 is the same as or similar to the network device 100 of FIG. 1A. In the embodiment of FIG. 3A, the intermediate node 304 is a network device separate from the transmitting node 308. As an illustrative example, in an embodiment, the transmitting node 308 is a part of a server or another network device that originates a timing packet 316. The transmitting node 308 generates the packet 316 to include the checksum 166 and the field 162, which includes a timestamp. The intermediate node 304 is a switching and/or routing device that receives the packet 316 from the transmitting node 308 via a first port, determines a second port via which a modified packet 316' is to be transmitted, and forwards the modified packet 316' to the second port. In an embodiment, the intermediate node 304 includes the forwarding engine 112 (FIG. 1A), which determines the second port via which the packet 316' is to be transmitted.

The intermediate node 304 also updates the timestamp in the field 162 by adding to an old value 124 of the field 162 an update value 120 corresponding to a time delay that the timing packet 316 is subject to as the timing packet 316 is processed by the intermediate node 304. For example, the intermediate node 304 includes the field updater 116 (FIG. 1A), which updates the timestamp in the field 162, according to an embodiment. In FIG. 3A, field 162 after being updated is shown as field 162'. The intermediate node 304 also updates the checksum 166 using techniques such as described previously so that the checksum remains valid in light of the updating of the timestamp in the field 162. For example, the intermediate node 304 includes the checksum updater 132 (FIG. 1A), which updates the checksum in the field 166 using the update value 120 and without using the old value 124 of the field 162, according to an embodiment. In FIG. 3A, field 166 after being updated is shown as field 166'.

Figure 3B:
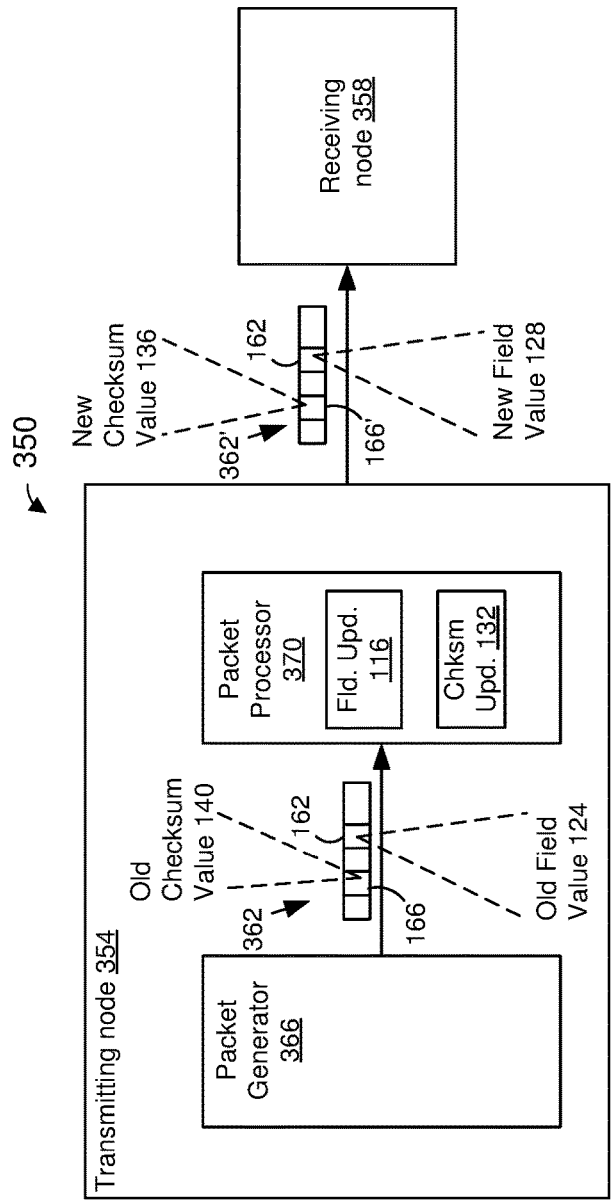
FIG. 3B is a block diagram of another example network device that modifies fields of packets prior to transmitting the packets, according to another embodiment.

Checksum techniques such as described above can also be utilized in devices that are not forwarding devices such as bridges or routers, in some embodiments. For example, FIG. 3B is a block diagram of an example network 350 that includes a transmitting node 354 and a receiving node 358, according to an embodiment. The transmitting node 354 is an endpoint device such as a computer, a server, etc., and the transmitting node 354 does not include the forwarding engine 112, according to an embodiment. The transmitting node 354 generates a timing packet 362 and transmits the timing packet to the receiving node 358.

The transmitting node 354 includes a packet generator 366 coupled to a packet processor 370. In an embodiment, the transmitting node 354 includes a network interface device configured to transmit and receive packets via a network link, and the packet processor 362 is a component of the network interface device. The packet generator 366 generates the timing packet 362 to include the checksum 166 and the field 162, which includes a timestamp. In an embodiment, the packet generator 366 is a central processing unit (CPU) or another controller that generates the timing packet 362, and the packet processor 370 is hardware device that updates the timestamp in the field 162 to make the timestamp more accurate before the transmitting node 354 transmits a modified packet 362' to the receiving node 358. For example, the packet processor 370 includes the field updater 116 (FIG. 1A), which updates the timestamp in the field 162, according to an embodiment. The field updater 116 adds to an old value 124 of the field 162 an update value 120 corresponding to a time delay between when the packet generator 366 generated the timing packet 362 and when the timing packet 362 is transmitted by the transmitting node 354. In FIG. 3B, field 162 after being updated is shown as field 162'.

The packet processor 370 also updates the checksum 166 using techniques such as described previously so that the checksum remains valid in light of the updating of the timestamp in the field 162. For example, the packet processor 370 includes the checksum updater 132 (FIG. 1A), which updates the checksum 166 using the update value 120 and without using the old value 124 of the field 162, according to an embodiment. In FIG. 3B, field 166 after being updated is shown as field 166'.

Although FIGS. 3A and 3B were described in the context of the field 162 including timestamp information, the field 162 includes other suitable types of information in other embodiments, such as time delay information (e.g., the field 162 corresponds to a time delay field), a hop count (e.g., the field 162 corresponds to a hop count field or a TTL field), etc.

Moreover, although embodiments discussed above involve updating a checksum field, other types of error detection information are updated in other embodiments.

Figure 4:
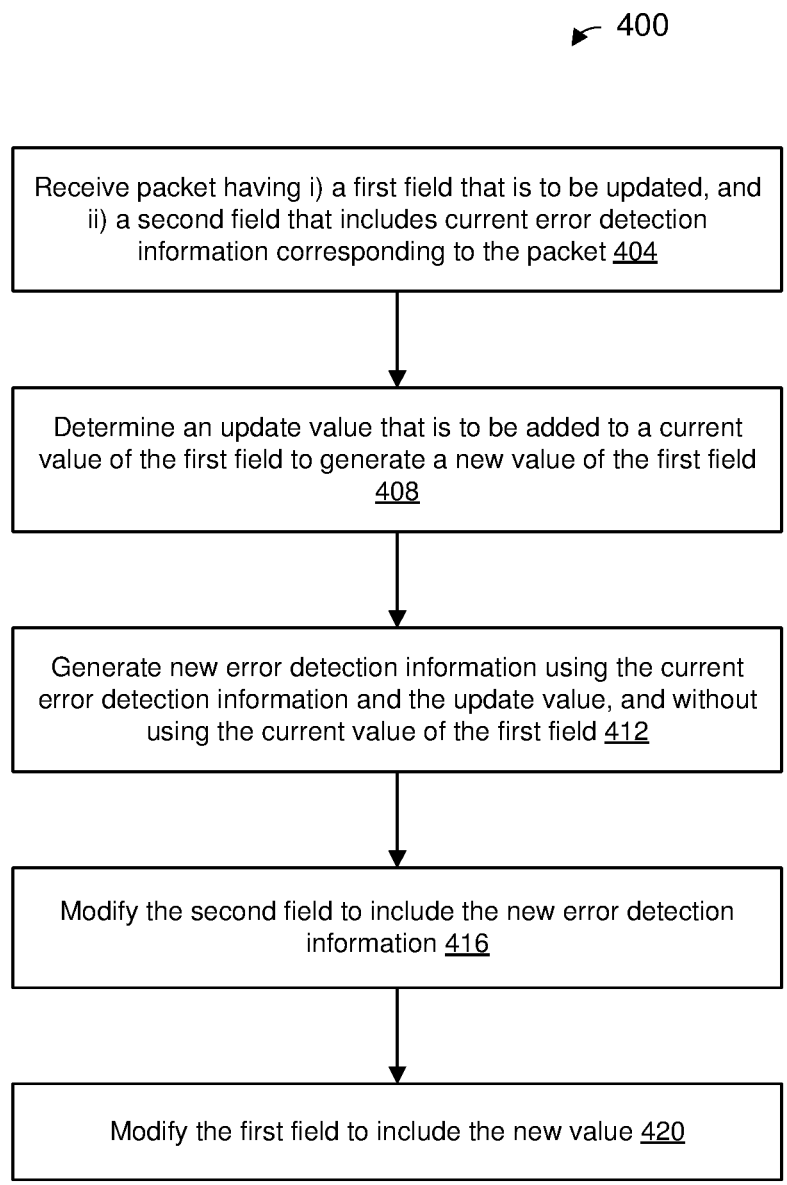
FIG. 4 is a flow diagram of an example method for updating fields in a packet, according to an embodiment.

FIG. 4 is a flow diagram of an example method 400 for updating fields in a packet, according to an embodiment. The method 400 is implemented by a suitable network device such as a bridge, a router, a network interface of an endpoint device, etc., according to various embodiments. For example, the method 400 is implemented by the network device 100 of FIG. 1A, the intermediate network node 304 of FIG. 3A, or the transmitting node 354 of FIG. 3B, according to various embodiments.

At block 404, the network device receives a packet having i) a first field that is to be updated by the network device, and ii) a second field that includes current error detection information corresponding to the packet. For example, the network device 100 (FIG. 1A) receives the packet 150 via one of the ports 104, the packet 150 including the field 162 and the checksum 166. As another example, the packet processor 108 of the network device 100 (FIG. 1A) receives the packet 150. As another example, the packet processor 370 (FIG. 3B) receives the packet 362. In an embodiment, the first field is the field 162 (FIGS. 1B, 3A, 3B), and the second field is the checksum 166 (FIGS. 1B, 3A, 3B). In other embodiments, the first field is another suitable field of a packet other than the field 162, and/or the second field corresponds to other suitable error detection information other than a checksum.

At block 408, the network device determines an update value that is to be added to a current value of the first field to generate a new value of the first field. For example, the first field includes time delay information, and the update value corresponds to an additional delay time corresponding to processing of the packet by the network device, according to an embodiment. As another example, the first field includes hop count information, and the update value is one, which corresponds to incrementing the hop count information, according to another embodiment. In an embodiment, the update value used at block 408 is the update value 12 (FIG. 1A).

At block 412, the network device generates the new error detection information for the second field using the current value of the second field (e.g., the old checksum value 140) and the update value (e.g., the update value 120) that is to be added to the current value of the first field (e.g., the field 162). In an embodiment, block 412 includes generating the new error detection information without using the current value of the first field (e.g., without using the old field value 124 (FIG. 1A). In an embodiment, block 412 includes performing the method 200 (FIG. 2), and/or using Equation 1. In an embodiment, block 412 is performed prior to the network device reading the current value of the first field in the packet.

At block 416, the network device modifies the second field (e.g., the checksum 166) to include the new error detection information generated at block 412. In an embodiment, block 416 is performed prior to the network device reading the current value of the first field in the packet.

At block 420, the network device modifies the first field (e.g., the field 162) to include the new value (e.g., the new field value 128), which new value is calculated by adding the update value (e.g., the update value 120) to the current value of the first field (e.g., the old field value 124). In an embodiment, the new value is calculated using an addition technique (e.g., one's complement addition or another suitable addition technique) used at block 412 to generate the new error detection information. In an embodiment, the network device performs block 420 after modifying the second field at block 416.

Embodiment 1

An apparatus, comprising: logic circuitry configured to: determine an update value that is to be added to a current value of a first field of a packet to update the first field in the packet, the packet also having a second field that includes current error detection information corresponding to content of the packet, and generate new error detection information using i) the current error detection information from the second field of the packet and ii) the update value, and without using the current value from the first field of the packet; and packet modification circuitry configured to: modify the second field of the packet to include the new error detection information, and modify the first field of the packet to include the new value.

Embodiment 2

The apparatus of embodiment 1, wherein: the update value is a first update value that comprises a plurality of bits; the logic circuitry is configured to partition the first update value into a plurality of words, each word including a respective group of bits from among the plurality of bits; the logic circuitry comprises adder circuitry configured to add the plurality of words to generate a second update value; and the logic circuitry is configured to generate the new error detection information in the second field using the second update value.

Embodiment 3

The apparatus of embodiment 2, wherein: the logic circuitry is configured to perform a logic operation on a current value of the error detection information in the second field to generate an intermediate value; and the adder circuitry is configured to add the second update value to the intermediate value.

Embodiment 4

The apparatus of embodiment 3, wherein: the intermediate value is a first intermediate value; and the adder circuitry is configured to add the second update value to the first intermediate value to generate a second intermediate value; and the logic circuitry is configured to perform the logic operation on the second intermediate value to generate the new error detection information.

Embodiment 5

The apparatus of any of embodiments 2-4, wherein: the adder circuitry is configured to perform one's complement addition; and the logic circuitry is configured to add the update value to the current value of the first field using one's complement addition.

Embodiment 6

The apparatus of any of embodiments 1-5, further comprising: first parser circuitry configured to extract the current value from the first field of the packet; and second parser circuitry configured to extract the current error detection information from the second field of the packet; wherein the logic circuitry is configured to generate the new error detection information prior to the first parser circuitry extracting the current value from the first field.

Embodiment 7

The apparatus of embodiment 6, wherein: the second parser circuitry comprises header parser circuitry configured to extract information from a plurality of fields in a header portion of the packet, including extracting the current error detection information from the second field in the header portion of the packet; and the first parser circuitry is configured to extract the current value from the first field in a payload portion of the packet.

Embodiment 8

The apparatus of any of embodiments 1-7, wherein the packet modification circuitry comprises: header modification circuitry configured to modify one or more fields in a header portion of the packet, including modifying the second field to include the new error detection information; and additional packet modification circuitry, separate from the header modification circuitry, configured to modify the first field in a payload portion of the packet.

Embodiment 9

The apparatus of any of embodiments 1-8, wherein: the first field includes time delay information; the update value that is to be added to the current value of the first field corresponds to an additional time delay corresponding to processing of the packet; and the second field includes checksum information corresponding to contents of the packet.

Embodiment 10

The apparatus of any of embodiments 1-8, wherein: the first field includes hop count information; the update value that is to be added to the current value of the first field is one; and the second field includes checksum information corresponding to contents of the packet.

Embodiment 11

A method, comprising: receiving, at a network device, a packet having i) a first field that is to be updated by the network device, and ii) a second field that includes current error detection information corresponding to content of the packet, the content including the first field; determining, at the network device, an update value that is to be added to a current value of the first field to generate a new value of the first field; generating, at the network device, new error detection information using the current error detection information and the update value, and without using the current value of the first field; modifying, at the network device, the second field to include the new error detection information; and modifying, at the network device, the first field to include the new value.

Embodiment 12

The method of embodiment 11, wherein: the update value is a first update value that comprises a plurality of bits; and generating the new error detection information comprises: partitioning the first update value into a plurality of words, each word including a respective group of bits from among the plurality of bits, adding the plurality of words to generate a second update value corresponding to a sum of the plurality of words, and generating the new error detection information in the second field using the second update value.

Embodiment 13

The method of embodiment 12, wherein generating the new error detection information comprises: performing a logic operation on a current value of the error detection information in the second field to generate a first intermediate value; adding the second update value to the first intermediate value to generate a second intermediate value; and generating the new error detection information in the second field using the second intermediate value.

Embodiment 14

The method of embodiment 13, wherein performing the logic operation on the current value of the error detection information includes inverting each bit of the current value of the error detection information to generate the first intermediate value.

Embodiment 15

The method of embodiment 14, wherein: generating the new error detection information further comprises: performing the logic operation on the second intermediate value to generate a third intermediate value, and generating the new error detection information in the second field using the third intermediate value.

Embodiment 16

The method of embodiment 15, wherein: performing the logic operation on the current value of the error detection information includes inverting each bit of the current value of the error detection information; and performing the logic operation on the second intermediate value includes inverting each bit of the second intermediate value.

Embodiment 17

The method of any of embodiments 12-16, wherein: adding the plurality of words to generate the second update value comprises adding the plurality of words using one's complement addition; and the method further comprises adding the update value to the current value of the first field using one's complement addition to generate the new value of the first field.

Embodiment 18

The method of any of embodiments 11-17, wherein generating the new error detection information without using the current value of the first field comprises: generating the new error detection information prior to the network device first reading the current value of the first field.

Embodiment 19

The method of any of embodiments 11-18, wherein: the first field includes time delay information; the update value that is to be added to the current value of the first field corresponds to an additional time delay corresponding to processing of the packet; and the second field includes checksum information corresponding to contents of the packet.

Embodiment 20

The method of any of embodiments 11-18, wherein: the first field includes hop count information; the update value that is to be added to the current value of the first field is one; and the second field includes checksum information corresponding to contents of the packet.

At least some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any computer readable memory such as on a magnetic disk, an optical disk, or other storage medium, in a RAM or ROM or flash memory, a memory of a processor, a hard disk drive, an optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An apparatus, comprising:
   logic circuitry configured to:
      determine an update value that is to be added to a current value of a first field of a packet to update the first field in the packet, the packet also having a second field that includes current error detection information corresponding to content of the packet, and
      generate new error detection information using i) the current error detection information from the second field of the packet and ii) the update value, and without using the current value from the first field of the packet; and
   packet modification circuitry configured to:
      modify the second field of the packet to include the new error detection information, and
      modify the first field of the packet to include the new value.

2. The apparatus of claim 1, wherein:
   the update value is a first update value that comprises a plurality of bits;
   the logic circuitry is configured to partition the first update value into a plurality of words, each word including a respective group of bits from among the plurality of bits;
   the logic circuitry comprises adder circuitry configured to add the plurality of words to generate a second update value; and the logic circuitry is configured to generate the new error detection information in the second field using the second update value.

3. The apparatus of claim 2, wherein:
the logic circuitry is configured to perform a logic operation on a current value of the error detection information in the second field to generate an intermediate value; and
the adder circuitry is configured to add the second update value to the intermediate value.

4. The apparatus of claim 3, wherein:
the intermediate value is a first intermediate value; and
the adder circuitry is configured to add the second update value to the first intermediate value to generate a second intermediate value; and
the logic circuitry is configured to perform the logic operation on the second intermediate value to generate the new error detection information.

5. The apparatus of claim 2, wherein:
the adder circuitry is configured to perform one's complement addition; and
the logic circuitry is configured to add the update value to the current value of the first field using one's complement addition.

6. The apparatus of claim 1, further comprising:
first parser circuitry configured to extract the current value from the first field of the packet; and
second parser circuitry configured to extract the current error detection information from the second field of the packet;
wherein the logic circuitry is configured to generate the new error detection information prior to the first parser circuitry extracting the current value from the first field.

7. The apparatus of claim 6, wherein:
the second parser circuitry comprises header parser circuitry configured to extract information from a plurality of fields in a header portion of the packet, including extracting the current error detection information from the second field in the header portion of the packet; and
the first parser circuitry is configured to extract the current value from the first field in a payload portion of the packet.

8. The apparatus of claim 1, wherein the packet modification circuitry comprises:
header modification circuitry configured to modify one or more fields in a header portion of the packet, including modifying the second field to include the new error detection information; and
additional packet modification circuitry, separate from the header modification circuitry, configured to modify the first field in a payload portion of the packet.

9. The apparatus of claim 1, wherein:
the first field includes time delay information;
the update value that is to be added to the current value of the first field corresponds to an additional time delay corresponding to processing of the packet; and
the second field includes checksum information corresponding to contents of the packet.

10. The apparatus of claim 1, wherein:
the first field includes hop count information;
the update value that is to be added to the current value of the first field is one; and
the second field includes checksum information corresponding to contents of the packet.

11. A method, comprising:
receiving, at a network device, a packet having i) a first field that is to be updated by the network device, and ii) a second field that includes current error detection information corresponding to content of the packet, the content including the first field;
determining, at the network device, an update value that is to be added to a current value of the first field to generate a new value of the first field;
generating, at the network device, new error detection information using the current error detection information and the update value, and without using the current value of the first field;
modifying, at the network device, the second field to include the new error detection information; and
modifying, at the network device, the first field to include the new value.

12. The method of claim 11, wherein:
the update value is a first update value that comprises a plurality of bits; and
generating the new error detection information comprises:
partitioning the first update value into a plurality of words, each word including a respective group of bits from among the plurality of bits,
adding the plurality of words to generate a second update value corresponding to a sum of the plurality of words, and
generating the new error detection information in the second field using the second update value.

13. The method of claim 12, wherein generating the new error detection information comprises:
performing a logic operation on a current value of the error detection information in the second field to generate a first intermediate value;
adding the second update value to the first intermediate value to generate a second intermediate value; and
generating the new error detection information in the second field using the second intermediate value.

14. The method of claim 13, wherein performing the logic operation on the current value of the error detection information includes inverting each bit of the current value of the error detection information to generate the first intermediate value.

15. The method of claim 13, wherein:
generating the new error detection information further comprises:
performing the logic operation on the second intermediate value to generate a third intermediate value, and
generating the new error detection information in the second field using the third intermediate value.

16. The method of claim 15, wherein:
performing the logic operation on the current value of the error detection information includes inverting each bit of the current value of the error detection information; and
performing the logic operation on the second intermediate value includes inverting each bit of the second intermediate value.

17. The method of claim 12, wherein:
adding the plurality of words to generate the second update value comprises adding the plurality of words using one's complement addition; and
the method further comprises adding the update value to the current value of the first field using one's complement addition to generate the new value of the first field.

18. The method of claim 11, wherein generating the new error detection information without using the current value of the first field comprises:

generating the new error detection information prior to the network device first reading the current value of the first field.

19. The method of claim 11, wherein:
the first field includes time delay information;
the update value that is to be added to the current value of the first field corresponds to an additional time delay corresponding to processing of the packet; and
the second field includes checksum information corresponding to contents of the packet.

20. The method of claim 11, wherein:
the first field includes hop count information;
the update value that is to be added to the current value of the first field is one; and
the second field includes checksum information corresponding to contents of the packet.

* * * * *